Feb. 25, 1958 W. G. MYERS 2,824,362
MACHINE FOR ASSEMBLING RESILIENT BUSHINGS
OF THE ELASTIC RUBBER INSERT TYPE
Filed Aug. 13, 1953 4 Sheets-Sheet 1
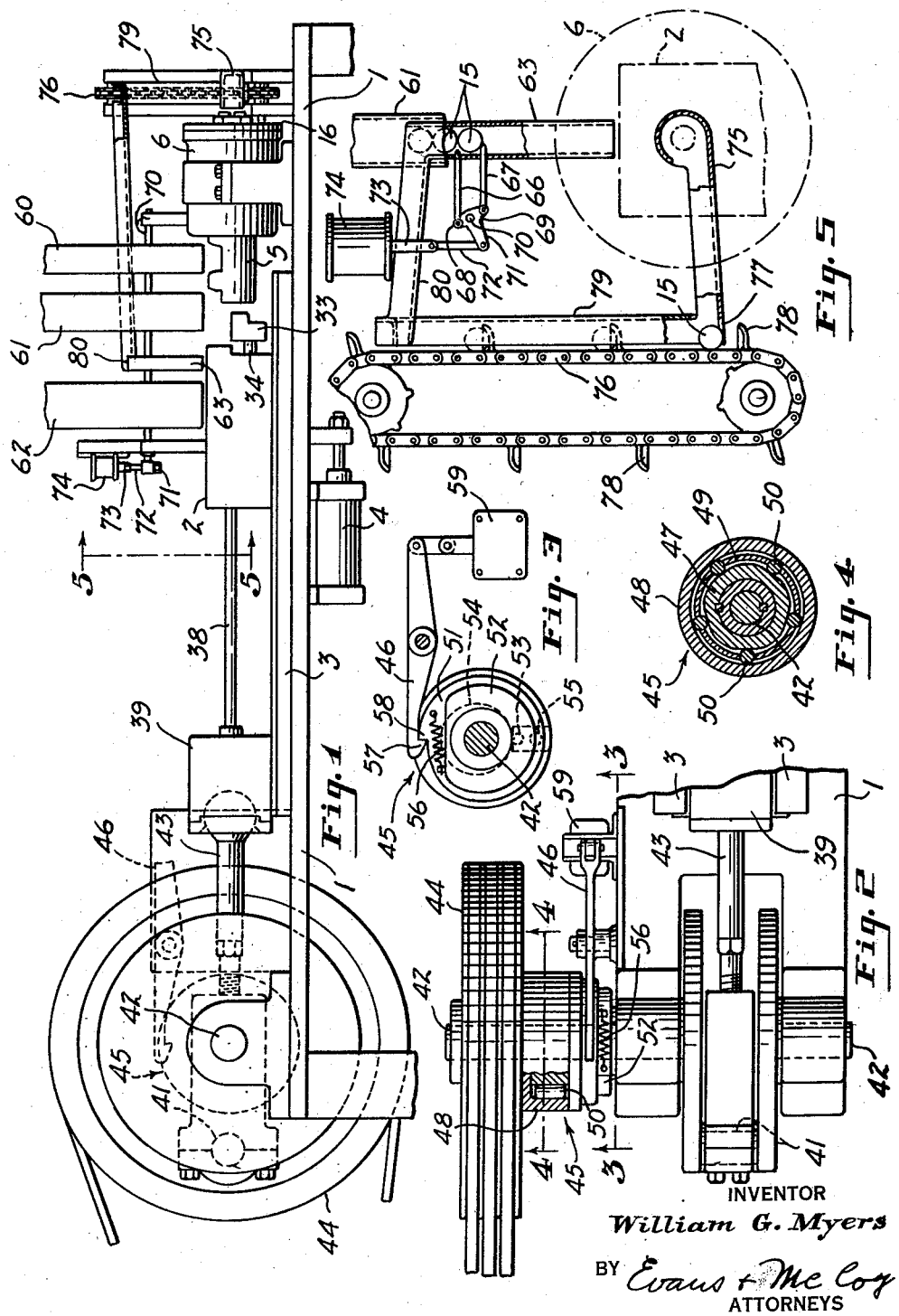
INVENTOR
William G. Myers
BY Evans + McCoy
ATTORNEYS

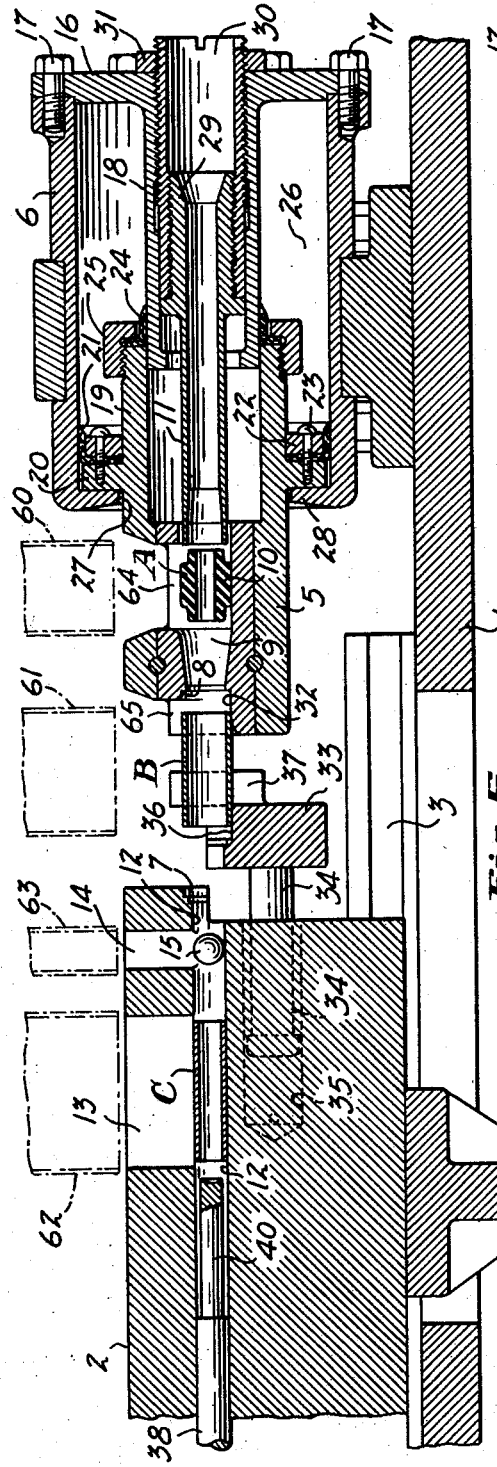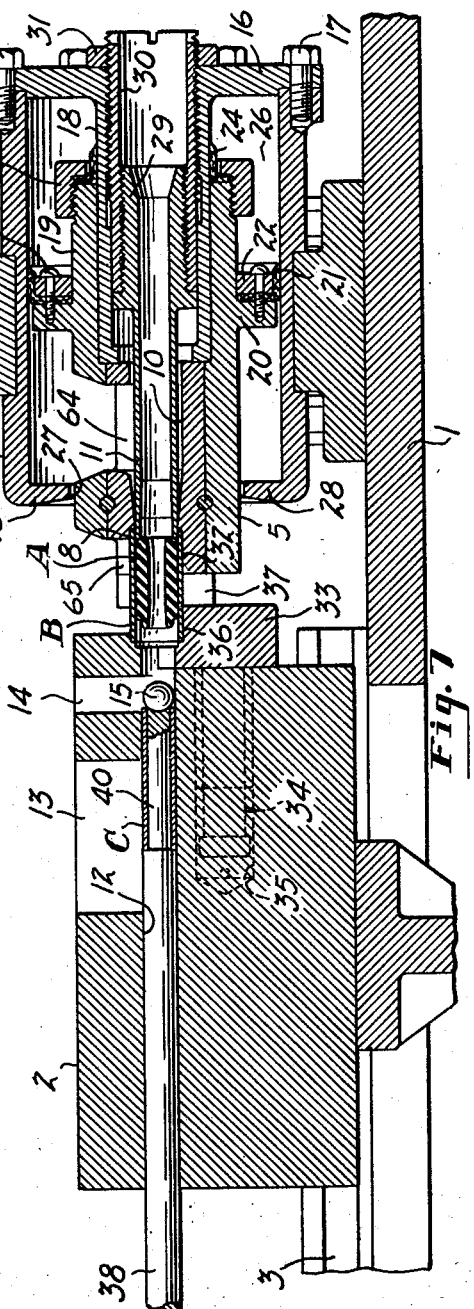

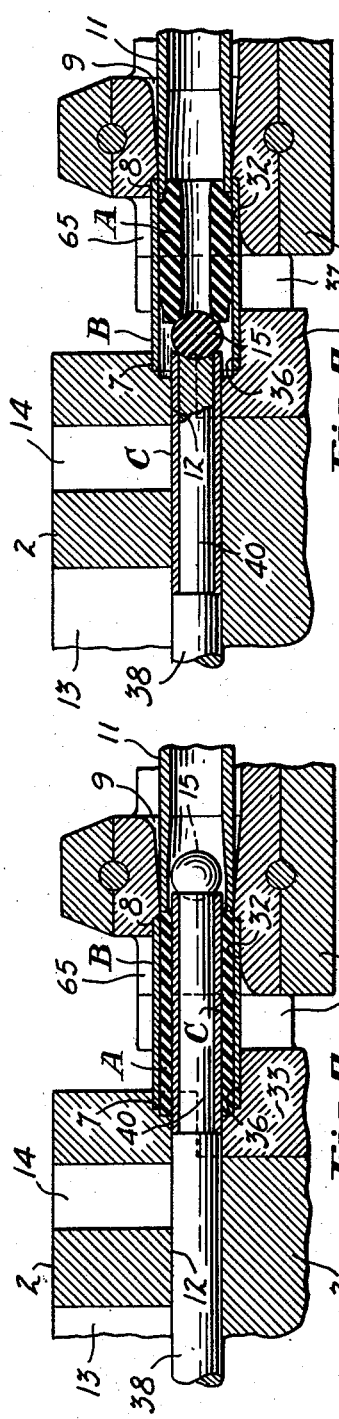

United States Patent Office 2,824,362
Patented Feb. 25, 1958

2,824,362

MACHINE FOR ASSEMBLING RESILIENT BUSHINGS OF THE ELASTIC RUBBER INSERT TYPE

William G. Myers, Logansport, Ind., assignor to The General Tire and Rubber Company, Akron, Ohio, a corporation of Ohio Application August 13, 1953, Serial No. 374,080

16 Claims. (Cl. 29—235)

This invention relates to machines for assembling resilient bushings of the type in which a tubular elastic rubber insert is positioned in the annular space between an outer rigid sleeve of an internal diameter considerably less than the normal external diameter of the insert and an inner rigid core of an external diameter considerably greater than the normal internal diameter of the insert and in which the rubber insert is subjected to radial compression sufficient to create a strong frictional bond between the insert and the sleeve and between the insert and the core.

The machine of the present invention operates to first enter the insert into the sleeve while the sleeve is clamped between opposed gripping members engaging the ends thereof and then to force the core into the insert while the sleeve is so clamped. Pressure is applied to the insert and core by plungers that have reciprocating motion relative to the sleeve clamping members. Means is provided for effecting the relative reciprocating movements of the plungers and clamping means in timed relation. Means is also provided for supporting a sleeve between the sleeve gripping members and an insert and a core in axial alinement with the sleeve and with the plungers, the machine being operated to grip the sleeve and to cause relative movements of the plungers with respect to the sleeve in such manner that the assembling operations are performed in the proper sequence. Means is also provided for feeding the insert, sleeve and core to the supporting means during a portion of the cycle of operation of the machine and for discharging a fully assembled bushing at the end of each cycle of operation.

In order to facilitate the entry of the core into the elastic rubber insert after the insert has been placed within the sleeve, a series of insert expanding pilots are provided together with means for feeding one of the pilots into the space between the core and the insert while the core is spaced from the insert, so that as the core is pushed by its plunger into the rubber insert the pilot is pushed ahead of the core through the insert to expand the same immediately in advance of the core to facilitate entry of the core. The pilots are preferably ball-shaped members of a diameter substantially the same as the external diameter of the core so that when one of the ball-shaped pilots is forced through an insert in advance of a core it expands the portion of the insert immediately in advance of the core so that the entry of the core into the rubber insert is not impeded by engagement of the blunt end of the core with the insert.

Each pilot member after being passed through an insert is discharged to suitable conveying means that returns it to the mechanism which feeds the pilots to the machine. A rubber insert, a sleeve, a core and a pilot are fed to the machine at the proper time during each cycle of operation thereof by suitable means. As herein shown, feed chutes for the inserts, sleeves, core and pilots are provided with suitable means for delivering articles one at a time from each chute to the machine.

The invention has for its object to provide an assembling machine which is automatic and which is capable of completely assembling a bushing during each cycle of operation of the machine.

A further object is to provide the machine with a series of insert expanding pilots that are fed, one in advance of each core so that it is forced through the rubber insert by the core, means being provided for returning each pilot member to the feeding means after it has passed through an insert.

Reference should be had to the accompanying drawings forming a part of this specification, in which:

Figure 1 is a side elevation of a machine embodying the invention;

Fig. 2 is a fragmentary top plan view showing the driving mechanism for operating the crankshaft to which the core inserting plunger is attached;

Fig. 3 is a section taken on the line indicated at 3—3 in Fig. 2, showing the single revolution clutch that controls the operation of the plunger actuating crankshaft;

Fig. 4 is a section through the single revolution clutch taken on the line indicated at 4—4 in Fig. 2;

Fig. 5 is a fragmentary end elevation of the machine showing the pilot returning and feeding means;

Fig. 6 is a fragmentary, central, longitudinal, vertical section through the machine showing the gripping members and plungers in the positions which they occupy when the parts to be assembled are fed to the machine;

Fig. 7 is a fragmentary section similar to Fig. 6, showing the gripping members in engagement with opposite ends of the sleeve, the insert positioned within the sleeve, the core inserting plunger in engagement with the core, and the core in engagement with a pilot member;

Fig. 8 is a fragmentary central longitudinal section showing the pilot member engaged with the rubber insert within the clamped tube;

Fig. 9 is a section similar to Fig. 8, showing the core in place within the insert;

Fig. 10 is a fragmentary longitudinal vertical section showing the parts of the machine in the positions which they occupy when an assembled bushing is being discharged from the machine.

Figure 11:
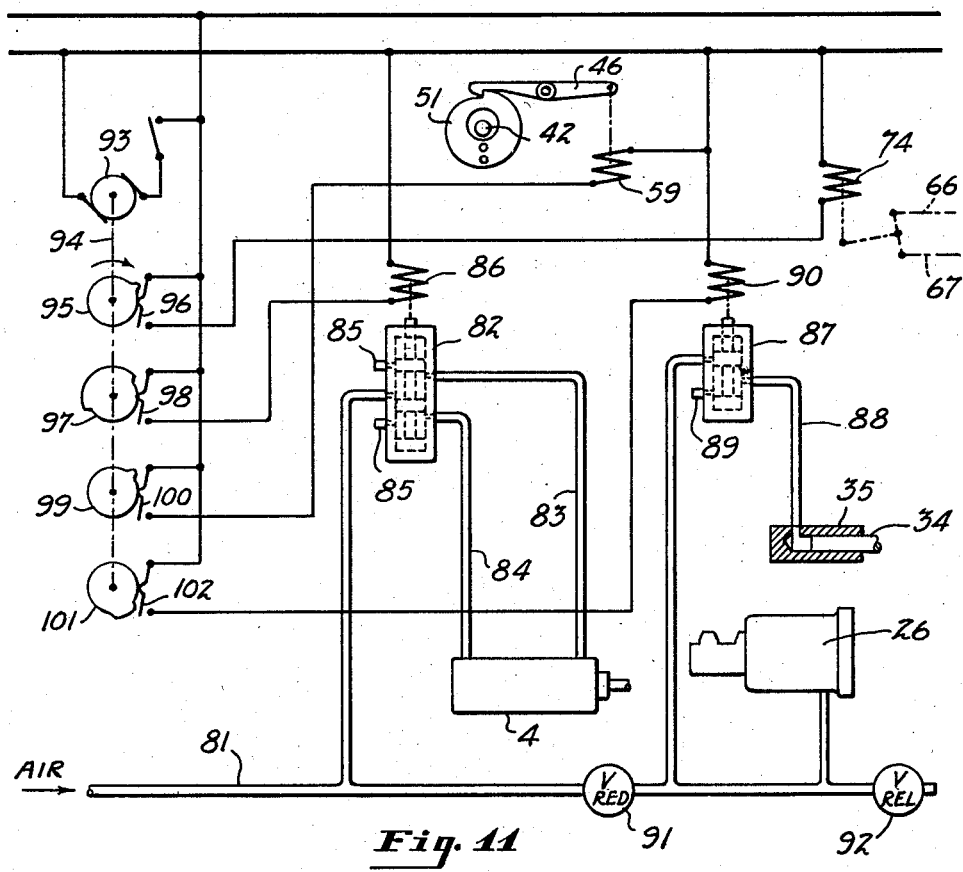
Fig. 11 is a diagrammatic view showing the fluid pressure connections and the timing device controlling the article feed mechanism, the pressure cylinders and the single revolution clutch.

Referring to the accompanying drawings, the machine of the present invention is designed to automatically assemble a resilient bushing that comprises an elastic rubber insert A, an outer sleeve B and an inner core C. As shown in Fig. 6, the elastic rubber insert A is normally of an external diameter materially greater than the internal diameter of the sleeve B and of an internal diameter materially less than the external diameter of the core C. When the insert is placed in the annular space between the core C and sleeve B it is elongated axially as shown in Fig. 9 and is held under a radial compression that is sufficient to provide a strong frictional bond between the rubber insert A and the sleeve B and between the insert A and the core C.

The machine of the present invention is mounted on a suitable bed 1 and is provided with a movable pressure applying clamping member 2 that is mounted on the bed to slide along a longitudinal way 3. The pressure applying member 2 is part of an insert and sleeve assembling press and is operated by a suitable power means such as a fluid pressure cylinder 4. A work clamping member 5 is opposed to the pressure applying member 2 and is slidable in a fixed cylindrical housing 6 whose axis is disposed parallel to the way 3. As best shown in Fig. 6, the opposed faces of the work clamping members 2 and 5 are provided with axially alined sleeve positioning sockets 7 and 8, and the member 5 is provided with a funnel-shaped insert guide 9 that is axially alined with the socket 8 and that is disposed with its small end opening to the socket 8. The member 5 is also provided with an insert receiving seat 10 adjacent the large end of the funnel guide 9 that supports an insert A in alinement with the funnel guide. A tubular insert engaging plunger 11 is mounted in fixed position within the housing 6 and in axial alinement with the funnel guide 9 for engagement with an insert A as the work clamping member 5 is moved into the housing 6 to force the insert A through the funnel guide 9 into a sleeve B clamped between the members 2 and 5.

The pressure applying work clamping member 2 is provided with a bore 12 that is in axial alinement with its socket 7 and which opens into the socket 7. The bore 12 is of a diameter to receive a core member C with a sliding fit and the member 2 is provided with an elongated slot 13 through which an insert C may be fed into the bore 12. Between the slot 13 and the socket 7 the member 2 is provided with a second slot 14 through which a pilot 15 may be entered into the bore 12 in advance of the core C. The pilots 15 are of a diameter substantially the same as the external diameter of the core C so that when pushed through an insert within a sleeve B they serve to expand the insert immediately in advance of the core to facilitate entry of the core into the insert. The pilots 15 are preferably ball-shaped and may be formed of rigid material such as steel or of an elastic deformable material such as rubber. In either case the pilot serves as an insert expanding member that moves through an insert in advance of the core. It is preferred to form the pilot of a relatively stiff but elastic rubber composition that will permit the pilot to be pressed into conformity with the end of the core and plunger and to be elongated axially under the pressure to which it is subjected during its passage through the insert.

The cylindrical housing 6 is closed at its outer end by a detachable head 16 secured to the body of the housing by bolts 17. As best shown in Figs. 6 and 7, the head 16 has an integral externally cylindrical projection 18 that extends inwardly into the interior of the housing 6 providing a guide for the work gripping member 5 which has an interiorly cylindrical socket portion 19 at its outer end that slidably receives the projection 18. The socket portion 19 serves as a piston and has an external circumferential flange 20 to which a packing ring 21 is clamped by means of a retaining ring 22 and screws 23. The packing ring 21 engages the cylindrical interior of the housing 6 and a second packing ring 24 clamped to the outer end of the socket portion 19 by a threaded collar 25 engages the cylindrical exterior of the projection 18 providing a pressure chamber 26 between the socket portion 19 and the head 16 of the housing 6.

The pressure chamber 26 is adapted to receive air under suitable pressure and provides an air spring for yieldably resisting movement of the member 5 into the housing 6 when pressure is applied to the member 5 by the work pressing member 2 and serves to maintain clamping pressure on the work during a portion of the return movement of the clamping member 2. The inner end of the housing 6 is provided with an opening 27 through which the inner end of the work gripping member 5 projects and an inwardly projecting flange 28 surrounding the opening 27 provides a stop against which the flange 20 engages, as shown in Fig. 6 to limit the inward movement of the member 5. The tubular plunger 11 has a threaded outer end 29 that is screwed into an adjusting sleeve 30 mounted in the head 16. The sleeve 30 is adjustable axially to properly position the insert engaging inner end of the plunger 11, the sleeve 30 having a screw threaded engagement with the interior of the tubular projection 18 and being held in adjusted position by a lock nut 31.

The clamping member 5 has a sleeve seat 32 that projects inwardly toward the pressure applying clamping member 2 to receive an end of a sleeve B and support the same in alinement with the socket 8 and funnel 9. The work pressing member 2 has a retractable sleeve supporting member 33 that is carried by parallel horizontal pistons 34 that slide in cylinders 35 in the member 2. The retractable member 33 has its top edge at the axis of the bore 12 and forms the lower half of the socket 7 when in retracted position. The air pressure in the cylinders 35 normally holds the member 33 in extended position as shown in Fig. 6, to position its inner face at a distance from the seat 32 less than the length of a sleeve B so that a sleeve B can be supported on the member 33 and the sleeve 32 in axial alinement with the sockets 7 and 8. The member 33 has a sleeve receiving seat portion 36 that projects a short distance inwardly of the socket 7 when the member 33 is retracted and which provides a support for the sleeve B when extended. The member 33 is provided with spaced vertical projections 37 on opposite sides of the seat 36 that engage with the inner face of the work gripping member 4 to transmit thrust from the member 2 to the member 5 when the sleeve B is engaged by the sockets 7 and 8.

After an insert A has been positioned on the seat 10 and a sleeve B has been positioned on the seats 32 and 36, as shown in Fig. 6, pressure is admitted to the cylinder 4 to advance the member 2 toward the member 5, causing the extensions 37 to engage the inner face of the member 5 on opposite sides of the sleeve so that upon continued movement of the member 2 the sleeve supporting member 33 is retracted and the sleeve B is engaged in the sockets 7 and 8. After the sleeve B is clamped between the members 2 and 5, the pressure exerted by the member 2 on the work gripping member 5 forces the member 5 into the cylindrical housing 6, causing the plunger 11 to engage the insert A and force it through the funnel 9 into the clamped sleeve B, as shown in Fig. 7 of the drawings.

Means is provided for entering the core C into the rubber insert A immediately after the entry of the insert A into the sleeve B and while the sleeve B is clamped between the members 2 and 5 and while the insert is engaged by the plunger 11 as shown in Fig. 4. A core inserting plunger 38 is provided that has a sliding fit in the bore 12 and that is attached to a slide 39 mounted in the way 3 for movement toward and away from the work pressing member 2. When the core C is of tubular form as shown herein, the plunger 38 is preferably provided at its inner end with a reduced end portion 40 that engages in the tubular core C, the plunger 38 being movable from a retracted position in which its inner end 40 is disposed outwardly of the slot 13, to a position in which a core pushed by the plunger 38 is entered into the insert A within the sleeve B as shown in Fig. 9.

A crank 41 on a transverse shaft 42 mounted on the bed 1 operates the slide 39 through a connecting rod 43 to impart reciprocations to the core inserting plunger 38. A single revolution is imparted to the crankshaft 42 during each cycle of operation of the machine to reciprocate the core inserting plunger 38. The crankshaft 42 is actuated by a flywheel pulley 44 to which the crankshaft 42 is intermittently connected by means of a single revolution clutch 45. The single revolution clutch may be of any suitable type adapted to be controlled by a trip member such as the latch lever 46.

As shown herein, the clutch includes a polygonal cam 47 fixed to the shaft 42, a drum 48 that has an internally cylindrical face surrounding the cam 47 and an annular cage 49 rotatable on the shaft 42 and carrying rollers 50 that are movable with the cage from positions in which each roller is positioned centrally of a flat face of the cam where they permit the drum 48 to turn freely about the cam 47 to positions where the rollers 50 are wedged between the cam 47 and drum 48 and provide a driving connection between the drum 48 and crankshaft 42. The cage 49 is shifted by means of a disk-shaped lever 51 that is connected to a collar 52 fixed to the shaft 42 by an axially extending pivot 53. The disk-shaped lever has a central opening 54 that is somewhat larger than the portion of the shaft 42 that extends through it so as to permit a short swinging movement on the pivot 53.

The disk-shaped lever 51 is connected to the cage 49 by a pivot 55 so that an angular movement of the disk about the pivot 53 imparts a turning movement to the cage 49. A spring 56 connected at one end to the disk-shaped lever 51 and at the other end to the collar 52 exerts a thrust on the disk-shaped lever 51 that tends to shift the cage 49 toward clutching position. The latch lever 46 has a tooth 57 that is engageable with a tooth 58 on the disk-shaped lever 51 to shift the lever 51 to clutch releasing position and to hold the shaft 42 against rotation. The latch lever is biased toward its engaging position and is moved out of engagement with the tooth 58 by suitable means such as a solenoid 59. Energization of the solenoid 59 moves the lever 46 out of clutch engaging position, permitting the spring 54 to shift the cage 49 to clutching position. The solenoid 59 is only momentarily energized so that the toothed end of the lever 46 immediately drops into engagement with the periphery of the disk-shaped lever 51 and rides thereon until the shaft 42 has turned through a complete revolution, whereupon the tooth 57 engages the tooth 58 and shifts the lever 51 in opposition to the spring 56 to disengage the clutch.

The core inserting plunger 38 is reciprocated in timed relation to the movements of the work pressing member 2 to insert the core C after the insert A has been pressed into the sleeve B and before the member 2 is retracted.

The insert A could be placed manually on the seat 10, the sleeve B on the seats 32 and 36 and the core C and pilot 15 in the bore 12 prior to each operation of the machine, but in order to enable the machine to operate continuously a rubber insert A, a sleeve B, a core C and a pilot 15 are delivered automatically to the machine and positioned in axial alinement between the plungers 11 and 38 during the portion of the operating cycle in which both the work pressing member 2 and the plunger 38 are in their retracted positions. The inserts A are fed to the machine through a chute 60 disposed directly above the seat 10. The sleeves B are delivered to the seats 32 and 36 through a chute 61 disposed directly over these seats. The cores C are delivered into the slot 13 through a chute 62 and the pilots 45 are delivered into the slots 14 through a chute 63, the slots 13 and 14 being directly beneath the chutes 62 and 63 when the member 2 is in fully retracted position. The insert receiving portion of the work gripping member 5 is provided with side walls 64 extending upwardly from opposite sides of the seat 10 to guide an insert dropped from the chute 60 to the seat 10. The projections 37 serve to guide one end of a sleeve B to the seat 36 and side walls 65 are provided at opposite sides of the seat 32 on the member 5 to guide the other end of the sleeve B to the seat 32.

Means is provided for simultaneously freeing an insert A from the chute 60, a sleeve B from the chute 61, a core C from the chute 62 and a pilot from the chute 63 while the plunger 38 and work pressing member 2 are in their retracted positions. Each of the chutes is provided with a pair of stop pins 66 and 67 that are carried by upwardly and downwardly projecting arms 68 and 69 attached to a horizontal shaft 70 positioned immediately to the rear of the chutes 60, 61, 62 and 63. The shaft 70 has an arm 71 connected by a link 72 to the armature 73 of a solenoid 74. The weight of the armature 73 normally holds the arm 71 in its lowermost position in which the lowermost pins 67 project into the chutes beneath the lowermost articles in the chutes. When the solenoid 74 is energized the pins 67 are withdrawn to release the lowermost articles from the chutes and the uppermost pins 66 are projected into the chutes to engage with the article immediately above the lowermost article so that only one article is released at a time. The solenoid 74 is momentarily energized to release the lowermost articles and when the solenoid is deenergized the armature 73 drops, withdrawing the pins 66 from the chutes and projecting the pins 67 into the chutes to position articles in the chutes for release by a subsequent energization of the solenoid 74.

The operation of the plunger 38 is so timed with respect to movements of the work pressing member 2 that the work gripping member 5 is retracted into the cylinder 6 and the insert A forced into the sleeve B before the plunger 38 presses the core C into the insert. During the final portion of the closing movement of the member 2 the clutch 45 is actuated to impart a reciprocation to the plunger 38. During the advancing movement of the plunger 38 it engages a core C and advances the core C and a pilot 15 to bring the ball pilot 15 into engagement with the insert A held in the sleeve B by the plunger 11, as shown in Fig. 8. Continued movement of the plunger 38 forces the ball pilot 15 through the insert A, expanding the insert ahead of the core C while the core C moves into the insert to the position shown in Fig. 9. After the core pilot 15 has been forced through the insert A it is discharged through the tubular plunger 11 into an inclined runway 75 that delivers to a conveyor that consists of an endless chain 76 running over suitable sprockets and driven at a suitable speed to elevate the core pilots 15 as they are discharged from the machine. The end of the runway 60 adjacent the chain 76 is provided with a slot 77 to receive fingers 78 attached at regularly spaced intervals to the chain 76. The fingers 78 serve to push the ball-shaped core pilots 15 through a vertical guideway 79 from which they are discharged laterally to an inclined chute 80 that delivers them to the upper end of the chute 63. A sufficient number of pilots are provided to provide a continuous supply of pilots for delivery one at a time into the bore 12 ahead of each core member.

As shown in Fig. 11, air under pressure is supplied to the cylinders 4, 26 and 35 from a pressure line 81. The cylinder 4 is controlled by a valve 82 that is connected by lines 83 and 84 to the inner and outer ends of the cylinder 4 and that is provided with exhaust outlets 85. The valve 82 is normally positioned to supply pressure to the inner end of the cylinder 4 and hold the member 2 in retracted position. The valve 82 is shifted by means of a solenoid 86 when the solenoid is energized to connect the outer end of the cylinder 4 to pressure and the inner end of the cylinder through the line 83 to exhaust to move the fluid pressing member 2 toward the opposed gripping member 5. During the work pressing stroke of the member 2, pressure is supplied to the cylinders 35 to yieldably resist retracting movement of the supporting member 33 from its sleeve receiving position shown in Fig. 6 to the sleeve gripping position shown in Fig. 7.

In order to permit discharge of an assembled bushing upon retraction of the member 2, means is provided for momentarily releasing the pressure in the cylinders 35 so that the supporting member 33 will remain in retracted position long enough after the assembly of a bushing is completed for the assembled bushing to be discharged from the machine. The supply of pressure to the cylinders 35 is controlled by a valve 87 that is connected to the cylinders 35 through a line 88 and that is provided with an exhaust outlet 89. The valve 89 is normally held in a position in which the cylinders 35 are connected to the pressure line 87 and is actuated by a solenoid 90 to a position where the cylinders 35 are connected to the exhaust 89, the solenoid 90 being momentarily actuated during the retracting movement of the work pressing member 2 to permit discharge of an assembled bushing when it is jarred out of engagement with the socket 7 by the impact of the flange 20 of the work gripping member 5 against the flange 28 of the housing 6. Sufficient pressure is maintained in the chamber 26 of the housing 6 to rapidly return the work pressing member 5 to insert receiving position after each actuation.

In order to maintain a proper pressure in the chamber 26 and cylinders 35, a reducing valve 91 is provided in the line 66 that controls the pressure in the cylinders 35 and the chamber 26 and a pressure relief valve 92 is also provided to prevent accumulation of excessive pressure in the chamber 26.

Upon completion of each cycle of operation of the machine the work pressing members 2 and 5 and the core inserting plunger 38 are positioned as shown in Figs. 1 and 6 of the drawings with the core and pilot receiving slots 13 and 14 of the member 2 directly beneath the chutes 62 and 63, the insert receiving seat 10 directly beneath the chute 60 and the sleeve receiving seats 32 and 36 directly beneath the chute 61. With the parts positioned as above described, the solenoid 74 is energized to deliver an insert A from the chute 60, a sleeve B from the chute 61, a core C from the chute 62 and a pilot 15 from the chute 63. With the insert A, sleeve B, core C and pilot 15 positioned as shown in Fig. 6, the solenoid 86 is energized to reverse the pressure in the cylinder 4 and advance the work pressing member 2 into engagement with the opposed work pressing member 5 to move the same into the housing 6 and cause the plunger 11 to force the insert A through the funnel guide 9 into the sleeve B as shown in Fig. 7. As the work pressing member 2 approaches the end of its closing movement, the solenoid 59 is energized to operate the single revolution clutch 45 to impart one revolution to the crankshaft 42 and a reciprocation to the plunger 38. During the advancing movement the plunger 38 forces a pilot 15 through the insert A and enters the core C into the insert A behind the pilot. The solenoid 84 is deenergized just before the movement of the plunger 38 is reversed to reverse the pressure in the cylinder 4 and retract the work pressing members 2. By properly timing the deenergization of the solenoid 86 the sleeve B and clamping members 2 and 5 can move with respect to the fixed plunger 11 from the position shown in Fig. 8 to the position shown in Fig. 9 during the final portion of the advancing stroke of the plunger 38 to facilitate the axial elongation of the insert.

The member 2 is retracted rapidly and the air pressure in the chamber 26 causes the work pressing member 5 to follow the member 2 until the flange 20 strikes the flange 27 of the housing 6. The impact of the flange 20 against the stationary flange 27 serves to jar the assembled bushing out of engagement with the socket 9 so that it can fall by gravity as shown in Fig. 10. In order to provide sufficient clearance for the discharge of the completed bushings means is provided for relieving the pressure in the cylinders 35 during the return movement of the work pressing member 2. The solenoid 90 is energized slightly prior to the reversal of pressure in the cylinder 4 that causes the retraction of the member 2 to release the pressure in the cylinders 35 so that the supporting member 33 will remain in retracted position during the retracting movement of the member 2 to provide sufficient space between the members 2 and 5 to permit the assembled bushing to fall from the seat 36.

Any suitable means may be provided for energizing the solenoids 74, 86, 59 and 90 in the proper sequence and in the proper timed relation. As herein shown a timer motor 93 drives a shaft 94 which has means for energizing the control solenoids to cause the machine to perform its cycle of operations during each revolution of the shaft.

The shaft 94 carries a cam 95 that momentarily closes a normally open switch 96 in series with the solenoid 74 to discharge an insert A from the chute 60, a sleeve B from the chute 61, a core C from the chute 62 and a pilot 15 from the chute 63, to the positions shown in Fig. 6.

A cam 97 on the shaft 93 closes a normally open switch 98 that is in series with the solenoid 86 controlling the cylinder 4 to move the work pressing member 2 to closed position. The cam 97 is formed to hold the switch 98 closed during a substantial portion of the revolution of the shaft to maintain pressure on the member 2 until the core has been inserted.

A cam 99 on the shaft 93 momentarily closes a normally open switch 100 that is in series with the solenoid 59 to energize the solenoid 59 and cause the core inserting plunger 38 to be reciprocated. The switch 100 is closed before the solenoid 86 is deenergized and a sufficient time interval is provided between the closing of the switch 100 and the deenergization of the solenoid 86 to permit the forward stroke of the plunger 38 to be nearly completed before the work pressing member 2 begins its retracting movement.

A cam 101 on the shaft 93 closes a switch 102 in series with the solenoid 90 just prior to the deenergization of the solenoid 86 and is formed to hold the switch 102 closed during the portion of the revolution of the shaft 93 during which the work pressing member 2 is moving to its retracted position so that the supporting member 33 will remain in retracted position long enough to permit discharge of the assembled bushing.

It is to be understood that in accordance with the provisions of the patent statutes, variations and modifications of the specific devices herein shown and described may be made without departing from the spirit of the invention.

What I claim is:

1. A machine for assembling resilient bushings that have a rigid outer sleeve, a rigid core and a tubular elastic rubber insert under radial compression between the sleeve and core comprising a sleeve and insert assembling press having opposed sleeve and insert engaging clamping members movable one toward the other to force an insert into a sleeve and to clamp the assembled sleeve and insert between said members, said clamping members having axially alined sockets for positioning the assembled sleeve and insert, one of said clamping members having a bore opening to its socket and axially alined therewith in which a core will slidably fit, the other of said clamping members having an opening centrally of its socket that is of a diameter not less than that of the bore, a core inserting plunger slidable in said bore, means for actuating said press to clamp said sleeve and to force an insert into the sleeve, means for advancing said plunger toward the clamped sleeve after an insert has been placed therein, insert expanding pilots of a diameter substantially equal to the external diameter of a core, and means for feeding a pilot into said bore between said plunger and the sleeve and insert and a core into said bore between said pilot and plunger whereby the core is pushed by the plunger into the insert and the pilot is pushed ahead of the core through the insert and discharged through said opening.

2. A machine for assembling resilient bushings that have a rigid outer sleeve, a rigid core and a tubular elastic rubber insert under radial compression between the sleeve and core comprising a sleeve and insert assembling press having opposed sleeve and insert engaging clamping members movable one toward the other to force an insert into a sleeve and to clamp the assembled sleeve and insert between said members, said clamping members having axially alined sockets for positioning the assembled sleeve and insert, one of said clamping members having a bore opening to its socket and axially alined therewith in which a core will slidably fit, the other of said clamping members having an opening centrally of its socket that is of a diameter not less than that of the bore, a core inserting plunger slidable in said bore, means for actuating said press to clamp said sleeve and to force an insert into the sleeve, means for advancing said plunger toward the clamped sleeve after an insert has been placed therein, insert expanding pilots of a diameter substantially equal to the external diameter of a core, means for feeding a pilot into said bore between said plunger and the sleeve and insert and a core into said bore between said pilot and plunger whereby the core is pushed by the plunger into the insert and the pilot is pushed ahead of the core through the insert and discharged through said opening, and means for conveying pilots so discharged to said feeding means.

3. A machine for assembling resilient bushings that have a rigid outer sleeve, a rigid core and a tubular elastic rubber insert under radial compression between the sleeve and core comprising a sleeve and insert assembling press having opposed sleeve and insert engaging clamping members movable one toward the other to force an insert into a sleeve and to clamp the assembled sleeve and insert between said members, said clamping members having axially alined sockets for positioning the assembled sleeve and insert, one of said clamping members having a bore opening to its socket and axially alined therewith in which a core will slidably fit, the other of said clamping members having an opennig centrally of its socket that is of a diameter not less than that of the bore, a core inserting plunger slidable in said bore, means for reciprocating said plunger, means timed with respect to the reciprocating movements of said plunger for delivering a sleeve and insert to said assembling press and for actuating said press to clamp the sleeve and force an insert into the sleeve, insert expanding pilots of a diameter substantially equal to the external diameter of a core, and means timed with respect to the reciprocating movements of said plunger for feeding a pilot into said bore between the plunger and the sleeve and insert and a core into said bore between the pilot and plunger whereby the core is pushed by the plunger into the insert and the pilot is pushed ahead of the core through the insert and discharged through said opening.

4. A machine for assembling resilient bushings that have a rigid outer sleeve, a rigid core and a tubular elastic rubber insert under radial compression between the sleeve and core comprising a sleeve and insert assembling press having opposed sleeve and insert engaging clamping members movable one toward the other to force an insert into a sleeve and to clamp the assembled sleeve and insert between said members, said clamping members having axially alined sockets for positioning the assembled sleeve and insert, one of said clamping members having a bore opening to its socket and axially alined therewith in which a core will slidably fit, the other of said clamping members having an openinng centrally of its socket that is of a diameter not less than that of the bore, a core inserting plunger slidable in said bore, insert expanding pilots of a diameter substantially equal to the external diameter of a core, means for actuating said press to clamp said sleeve and to force an insert into the sleeve, means timed with respect to said press actuating means to feed a core and a pilot into said bore with the core between the pilot and said plunger, and means timed with respect to said press operating means for advancing said plunger toward the core to push the core into the insert and to push the pilot ahead of the core through the insert and discharge it through said opening.

5. A machine for assembling resilient bushings that have a rigid outer sleeve, a rigid core and a tubular elastic rubber insert under radial compression between the sleeve and core comprising a sleeve and insert assembling press having opposed sleeve and insert engaging clamping members movable one toward the other to force an insert into a sleeve and to clamp the assembled sleeve and insert between said members, said clamping members having axially alined sockets for positioning the assembled sleeve and insert, one of said clamping members having a bore opening to its socket and axially alined therewith in which a core will slidably fit, the other of said clamping members having an opening centrally of its socket that is of a diameter not less than that of the bore, a core inserting plunger slidable in said bore, insert expanding pilots of a diameter substantially equal to the external diameter of a core, means for actuating said press to clamp said sleeve and to force an insert into the sleeve, means timed with respect to said press actuating means to feed a core and a pilot into said bore with the core between the pilot and said plunger, means timed with respect to said press operating means for advancing said plunger toward the core to push the core into the insert and to push the pilot ahead of the core through the insert and discharge it through said opening, and means for conveying pilots so discharged to said feeding means.

6. In a machine for assembling resilient bushings that have a rigid outer sleeve, a rigid core and a tubular insert of elastic rubber under radial compression between the sleeve and core, an axially movable plunger of a diameter corresponding to the external diameter of the core, means comprising a pair of clamping members engageable with opposite ends of an assembled sleeve and insert for holding the assembled sleeve and insert in the path of said plunger and in axial alinement therewith, the clamping member engaging the end of the assembled sleeve and insert facing said plunger having a plunger receiving bore and the other clamping member having an opening alined with said bore and of a diameter not less than that of said bore, means for reciprocating said plunger toward and away from a clamped sleeve and insert, ball shaped pilot members for facilitating the entry of cores into the inserts each of a diameter substantially corresponding to the external diameter of a core, and means for feeding a core and a pilot member into said bore between said plunger and the clamped sleeve and insert with the pilot member between the core and the insert during the portion of each reciprocating stroke in which the plunger is retracted, whereby the pilot member is pushed ahead of the core through the insert and discharged through said opening.

7. In a machine for assembling resilient bushings that have a rigid outer sleeve, a rigid core and a tubular insert of elastic rubber under radial compression between the sleeve and core, an axially movable plunger of a diameter corresponding to the external diameter of the core, means comprising a pair of clamping members engageable with opposite ends of an assembled sleeve and insert for holding the assembled sleeve and insert in the path of said plunger and in axial alinement therewith, the clamping member engaging the end of the assembled sleeve and insert facing said plunger having a plunger receiving bore and the other clamping member having an opening alined with said bore and of a diameter not less than that of said bore, means for reciprocating said plunger toward and away from a clamped sleeve and insert, ball-shaped pilot members for facilitating the entry of cores into the inserts each of a diameter substantially corresponding to the external diameter of a core, means for feeding a core and a pilot member into said bore between said plunger and the clamped sleeve and insert with the pilot member between the core and the insert during the portion of each reciprocating stroke in which the plunger is retracted, whereby the pilot member is pushed ahead of the core through the insert and discharged through said opening, and means for conveying pilot members so discharged to said feeding means.

8. In a machine for assembling resilient bushings that have a rigid outer sleeve, a rigid core and a tubular insert of elastic rubber under radial compression between the sleeve and core, an axially movable plunger of a diameter corresponding to the external diameter of the core, means comprising a pair of clamping members engageable with opposite ends of an assembled sleeve and insert for holding the assembled sleeve and insert in the path of said plunger and in axial alinement therewith, the clamping member engaging the end of the assembled sleeve and insert facing said plunger having a plunger receiving bore and the other clamping member having an opening alined with said bore and of a diameter not less than that of said bore, the first mentioned clamping member having an opening through which a core may be entered into said bore and a second opening between the core opening and the sleeve engaging portion thereof of a size to permit passage of a ball of the same diameter as the core, and means for moving said plunger from a retracted position clear of said openings toward the clamped sleeve and insert to push a core and a ball through the bore and into an insert within the sleeve.

9. In a machine for assembling resilient bushings that have a rigid outer sleeve, a rigid core and a tubular insert of elastic rubber under radial compression between the sleeve and core, an axially movable plunger of a diameter corresponding to the external diameter of the core, means comprising a pair of clamping members engageable with opposite ends of an assembled sleeve and insert for holding the assembled sleeve and insert in the path of said plunger and in axial alinement therewith, the clamping member engaging the end of the assembled sleeve and insert facing said plunger having a plunger receiving bore and the other clamping member having an opening alined with said bore and of a diameter not less than that of said bore, the first mentioned clamping member having an opening through which a core may be entered into said bore and a second opening between the core opening and the sleeve engaging portion thereof of a size to permit passage of a ball of the same diameter as the core, means for reciprocating said plunger from a retracted position clear of said openings to a position adjacent the clamped sleeve, and means operable while said plunger is in retracted position for feeding a core and a ball through said openings into said bore.

10. A machine for assembling resilient bushings that have a rigid outer sleeve, a rigid core and a tubular elastic rubber insert under radial compression between the sleeve and core comprising a pair of relatively movable clamping members engageable with opposite ends of a sleeve having an elastic tubular rubber insert within it, said clamping members having axially alined sleeve positioning sockets, one of said clamping members having a bore opening to its socket and axially alined therewith that is of a diameter but slightly greater than the external diameter of a core, the other of said clamping members having an opening centrally of its socket that is of a diameter not less than that of said bore, an axially movable plunger slidably fitting in said bore and having a core engaging end movable toward a sleeve and insert held by said clamping members, means for reciprocating said plunger, ball-shaped pilot members of a diameter substantially corresponding to the external diameter of the core, and means operable during the portion of the stroke of said plunger in which the plunger is retracted for feeding a core and a pilot member into said bore in advance of said plunger with the pilot in advance of the core whereby the core is pushed by said plunger into the rubber insert and a pilot member is pushed by the core through the insert and is discharged through the opening of said other clamping member.

11. A machine for assembling resilient bushings that have a rigid outer sleeve, a rigid core and a tubular elastic rubber insert under radial compression between the sleeve and core comprising a pair of relatively movable clamping members engageable with opposite ends of a sleeve having an elastic tubular rubber insert within it, said clamping members having axially alined sleeve positioning sockets, one of said clamping members having a bore opening to its socket and axially alined therewith that is of a diameter but slightly greater than the external diameter of a core, the other of said clamping members having an opening centrally of its socket that is of a diameter not less than that of said bore, an axially movable plunger slidably fitting in said bore and having a core engaging end movable toward a sleeve and insert held by said clamping members, means for reciprocating said plunger, ball-shaped pilot members of a diameter substantially corresponding to the external diameter of the core, means operable during the portion of the stroke of said plunger in which the plunger is retracted for feeding a core and a pilot member into said bore in advance of said plunger with the pilot in advance of the core whereby the core is pushed by said plunger into the rubber insert and a pilot member is pushed by the core through the insert and is discharged through the opening of said other clamping member, and means for conveying pilot members so discharged to said feeding means.

12. A machine for assembling resilient bushings that have a rigid outer sleeve, a rigid core and a tubular elastic rubber insert under radial compression between the sleeve and core comprising a sleeve and insert assembling press having opposed sleeve and insert engaging clamping members movable one toward the other to force an insert into the sleeve, said clamping members having axially alined sockets for positioning the assembled sleeve and insert, one of said clamping members having a bore opening to its socket and axially alined therewith that is of a diameter but slightly greater than the external diameter of a core and being provided with two longitudinally spaced lateral openings to said bore, the other of said clamping members having an opening centrally of its socket that is of a diameter not less than that of said bore, an axially movable core inserting plunger slidable in said bore, means for reciprocating said plunger inwardly toward and outwardly away from a sleeve and insert clamped between said members, ball-shaped pilot members of a diameter substantially the same as the external diameter of the core, means controlled by said reciprocating means for feeding a core to said bore through the outer of said openings and for feeding a pilot member to said bore in advance of said core through the inner of said openings during the portion of the reciprocating stroke of the plunger in which the plunger is positioned outwardly of said openings, whereby the core is pushed by said plunger into the rubber insert and a pilot member is pushed through the insert by the core and discharged through said opening, and means for conveying pilot members so discharged to said feeding means.

13. A machine for assembling an elastic tubular insert between an outer rigid tube and an inner rigid core comprising a sleeve and insert assembling press having opposed sleeve clamping members provided with axially alined sleeve positioning sockets, one of said clamping members having a guide funnel axially alined with its socket with its small end opening to said socket and a seat for supporting an insert in axial alinement with said funnel, the other of said clamping members having a bore extending from its socket in axial alinement therewith that is of a size to receive a core with a sliding fit, said clamping members having oppositely projecting sleeve seats for supporting a sleeve between them in axial alinement with the bore and funnel, a tubular insert engaging plunger axially alined with said funnel that is of an internal diameter at least as great as said bore, a core inserting plunger slidable in said bore, means for delivering an insert and a sleeve to said seats, means for actuating said press to clamp said sleeve and to advance said tubular plunger through said funnel, core expanding pilots of a diameter substantially the same as the core, means timed with respect to the operation of said press for reciprocating said plunger, and means timed with respect to the movements of the plunger for feeding a pilot into said bore in advance of the plunger and for feeding a core into said bore between the plunger and pilot whereby the core is pushed into the insert by the plunger and the pilot is pushed through the insert ahead of the core and discharged through said tubular plunger.

14. In a machine for assembling resilient bushings having an outer rigid sleeve, an inner rigid core and an elastic rubber insert under radial compression between the sleeve and core, a pair of clamping members having axially alined positioning sockets in their opposed faces adapted to receive opposite ends of an assembled sleeve and insert, one of said members having a bore opening to its socket in axial alinement therewith and of a diameter but slightly greater than the external diameter of a core, the other of said clamping members having an opening centrally of its socket of a diameter at least as great as that of said bore, a series of insert expanding pilots, each of a diameter substantially the same as that of the core, a plunger slidable in said bore toward and away from the socket into which the bore opens, means for actuating said clamping members to clamp a sleeve having an insert therein, means timed with respect to said actuating means for reciprocating said plunger toward and away from a position in which its free end is adjacent the sleeve positioning socket to which said bore opens, and means for feeding a core into said bore between the plunger and the clamped sleeve and for feeding one of said pilots into said bore between the core and said sleeve whereby the core is pushed by the plunger into the insert and the pilot is pushed ahead of the core through the insert and discharged through said opening.

15. In a machine for assembling resilient bushings having an outer rigid sleeve, an inner rigid core and an elastic rubber insert under radial compression between the sleeve and core, a pair of clamping members having axially alined positioning sockets in their opposed faces adapted to receive opposite ends of an assembled sleeve and insert, one of said members having a bore opening to its socket in axial alinement therewith and of a diameter but slightly greater than the external diameter of a core, the other of said clamping members having an opening centrally of its socket of a diameter at least as great as that of said bore, a series of insert expanding pilots, each of a diameter substantially the same as that of the core, a plunger slidable in said bore toward and away from the socket into which the bore opens, means for actuating said clamping members to clamp a sleeve with an insert therein, means for reciprocating said plunger toward and away from a position in which its free end is adjacent the sleeve positioning socket to which said bore opens, means for feeding a core into said bore between the plunger and the clamped sleeve and for feeding one of said pilots into said bore between the core and said sleeve whereby the core is pushed by the plunger into the insert and the pilot is pushed ahead of the core through the insert and discharged through said opening, and means for returning each pilot so discharged to the feeding means.

16. In a machine for assembling resilient bushings having an outer rigid sleeve, an inner rigid core and an elastic rubber insert under radial compression between the sleeve and core, a pair of clamping members having axially alined positioning sockets in their opposed faces adapted to receive opposite ends of an assembled sleeve and insert, one of said members having a bore opening to its socket in axial alinement therewith and of a diameter but slightly greater than the external diameter of a core, the other of said clamping members having an opening centrally of its socket of a diameter at least as great as that of said bore, a series of insert expanding pilots, each of a diameter substantially the same as that of the core, a plunger slidable in said bore toward and away from the socket into which the bore opens, a crankshaft for actuating said plunger, a continuously rotating driving member, a single revolution clutch for connecting said driving member to said crankshaft, means for actuating said clamping members to clamp a sleeve with an insert therein, means for feeding a core into said bore between the plunger and the clamped sleeve and insert and for feeding one of said pilots into said bore between the core and sleeve, and timing means controlling the operation of said clamping means said feeding means and said clutch to successively operate said feeding means said clamping means and said clutch.

References Cited in the file of this patent
UNITED STATES PATENTS

| | | |
|---|---|---|
| 1,881,533 | Hardiman | Oct. 11, 1932 |
| 2,005,666 | Smith | June 18, 1935 |
| 2,133,161 | Colbert | Oct. 11, 1938 |
| 2,492,227 | Korecky | Dec. 27, 1949 |
| 2,604,692 | Broden | July 29, 1952 |
| 2,660,780 | Beck | Dec. 1, 1953 |